(12) United States Patent
Kitagawa

(10) Patent No.: US 9,160,928 B2
(45) Date of Patent: Oct. 13, 2015

(54) IMAGE CAPTURE APPARATUS SENSING IMAGE CAPTURING CONDITION, IMAGE PROCESSING METHOD, AND STORAGE MEDIUM

(71) Applicant: CASIO COMPUTER CO., LTD., Shibuya-ku, Tokyo (JP)

(72) Inventor: Hiroyasu Kitagawa, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/332,034

(22) Filed: Jul. 15, 2014

(65) Prior Publication Data

US 2015/0042861 A1    Feb. 12, 2015

(30) Foreign Application Priority Data

Aug. 6, 2013 (JP) .................... 2013-163232

(51) Int. Cl.
 *H04N 5/222* (2006.01)
 *H04N 5/235* (2006.01)
 *G06F 3/033* (2013.01)
 *G09G 5/08* (2006.01)
 (Continued)

(52) U.S. Cl.
 CPC ........... *H04N 5/23293* (2013.01); *H04N 5/217* (2013.01)

(58) Field of Classification Search
 CPC ............... G06F 3/0346; G06F 1/1626; G06F 2200/1614; H04N 5/23293; H04N 5/23222; H04N 5/23225; G06K 9/32; G06K 9/3208
 USPC ............ 348/333.01–333.13, 222.1–261
 See application file for complete search history.

(56) References Cited

U.S. PATENT DOCUMENTS 6,360,170 B1 * 3/2002 Ishikawa et al. .............. 701/300
7,668,454 B2 * 2/2010 Battles et al. ................. 396/281
(Continued)

FOREIGN PATENT DOCUMENTS

JP    2004104463 A    4/2004
JP    2004179708 A    6/2004
(Continued)

OTHER PUBLICATIONS

Japanese Office Action dated Dec. 16, 2014, issued in counterpart Japanese Application No. 2013-163232.

*Primary Examiner* — Chia-Wei A Chen
(74) *Attorney, Agent, or Firm* — Holtz, Holtz, Goodman & Chick PC

(57) ABSTRACT

An image capture apparatus includes an output unit, a first horizon maintaining assistance processing unit, and a second horizon maintaining assistance processing unit. The output unit sequentially outputs and displays captured images on a display screen. The first horizon maintaining assistance processing unit and the second horizon maintaining assistance processing unit determines whether it is difficult to identify a capturing condition of the captured image that is sequentially outputted and displayed by the output unit by way of the output unit. Furthermore, in a case in which it is determined that it is difficult to identify the capturing condition in the captured image by way of visual recognition of the display screen, the first horizon maintaining assistance processing unit and the second horizon maintaining assistance processing unit display a guidance relating to the capturing condition on the display screen or executes correction processing on the captured image.

11 Claims, 6 Drawing Sheets

(51) Int. Cl.
*H04N 5/232* (2006.01)
*H04N 5/217* (2011.01)

(56) References Cited

U.S. PATENT DOCUMENTS

| | | | | |
|---|---|---|---|---|
| 7,679,653 | B2 * | 3/2010 | Knutson-Ek | 348/224.1 |
| 7,817,186 | B2 * | 10/2010 | Tamamura | 348/208.12 |
| 8,064,719 | B2 * | 11/2011 | Ozluturk | 382/275 |
| 8,102,429 | B2 * | 1/2012 | Molgaard | 348/208.3 |
| 8,259,174 | B2 * | 9/2012 | Zhang et al. | 348/148 |
| 8,760,556 | B2 * | 6/2014 | Lin | 348/333.08 |
| 8,786,751 | B2 * | 7/2014 | Kinoshita | 348/333.02 |
| 8,922,669 | B2 | 12/2014 | Mochimizo | 348/222.1 |
| 2003/0169350 | A1 * | 9/2003 | Wiezel et al. | 348/239 |
| 2006/0098112 | A1 * | 5/2006 | Kelly | 348/333.12 |
| 2008/0044169 | A1 * | 2/2008 | Wernersson | 396/50 |
| 2008/0158392 | A1 * | 7/2008 | Nikata | 348/234 |
| 2009/0096910 | A1 * | 4/2009 | Yasuda et al. | 348/333.01 |
| 2011/0187914 | A1 * | 8/2011 | Lee | 348/333.11 |
| 2011/0242394 | A1 * | 10/2011 | Ohdate | 348/333.02 |
| 2011/0310283 | A1 * | 12/2011 | Shiozaki | 348/333.06 |
| 2012/0027390 | A1 * | 2/2012 | Ueyama | 396/50 |
| 2012/0099804 | A1 * | 4/2012 | Aguilera et al. | 382/285 |
| 2012/0274830 | A1 | 11/2012 | Kameyama et al. | |
| 2012/0300051 | A1 * | 11/2012 | Daigo et al. | 348/77 |
| 2013/0038759 | A1 * | 2/2013 | Jo et al. | 348/240.99 |
| 2013/0107103 | A1 * | 5/2013 | Kato | 348/333.12 |
| 2013/0235247 | A1 * | 9/2013 | Shinohara et al. | 348/333.02 |
| 2014/0125844 | A1 * | 5/2014 | Sumitomo | 348/231.99 |
| 2014/0184869 | A1 * | 7/2014 | Misawa et al. | 348/333.03 |
| 2014/0285698 | A1 * | 9/2014 | Geiss, Ryan | 348/333.05 |
| 2014/0300779 | A1 * | 10/2014 | Yeo et al. | 348/234 |
| 2015/0029346 | A1 * | 1/2015 | Sieger et al. | 348/207.1 |

FOREIGN PATENT DOCUMENTS

| | | |
|---|---|---|
| JP | 2006165941 A | 6/2006 |
| JP | 2010187200 A | 8/2010 |
| JP | 2011142574 A | 7/2011 |
| JP | 2012039452 A | 2/2012 |
| JP | 2012235232 A | 11/2012 |

* cited by examiner

FIG. 3A        FIG. 3B
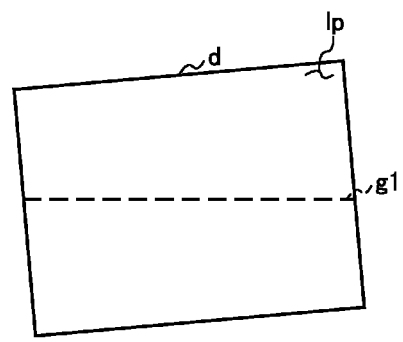 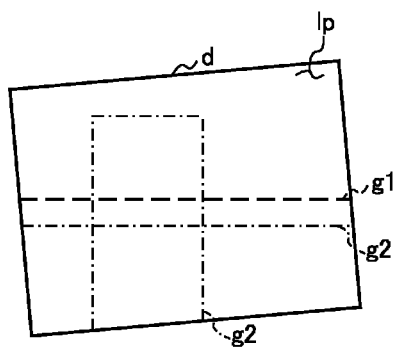
FIG. 4
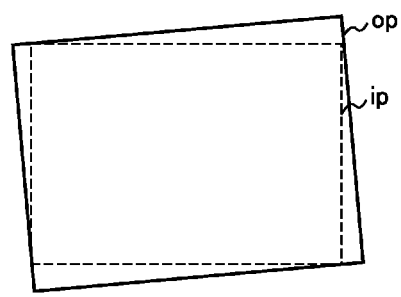

IMAGE CAPTURE APPARATUS SENSING IMAGE CAPTURING CONDITION, IMAGE PROCESSING METHOD, AND STORAGE MEDIUM

This application is based on and claims the benefit of priority from Japanese Patent Application No. 2013-163232, filed on 6 Aug. 2013, the content of which is incorporated herein by reference.

BACKGROUND OF THE INVENTION

1. Field of the Invention

The present invention relates to an image capture apparatus, an image capture method, and a storage medium.

2. Related Art

Photography has recently improved with technologies such as continuous compositing like HDR (High Dynamic Range imaging) even when a condition in which it is difficult to discern an image capture condition (a state of a photographing composition, a focus, a subject, and the like) on a live view screen such as a scene against the light and a night scene.

However, there may be a case in which photographing cannot be conducted at the image captured condition as desired due to the live view screen being unable to be discerned.

Furthermore, recently, there may also be a case in which, for example, when trying to photograph a scene from evening scene to night scene using time-lapse photography to perform low speed photography, a live view screen cannot be discerned in a backlight in the sunset upon setting an angle of field before photographing, a result of which the angle of field is different from the photographing composition (image capture condition) that the user has imagined when lights turn on in the night scene. For example, as in Unexamined Japanese Patent Application, Publication No. 2010-187200, a technology has been disclosed for performing guidance display of functions in response to image capture conditions.

SUMMARY OF THE INVENTION

An image capture apparatus according to the first aspect of the present invention includes: an output unit that sequentially outputs and displays captured images on a display screen; a determination unit that determines whether it is difficult to identify a capturing condition of the captured image that is sequentially outputted and displayed by the output unit by way of visual recognition of the display screen; and an execution unit that, in a case in which the determination unit determines that it is difficult to identify the capturing condition in the captured image by way of visual recognition of the display screen, displays a guidance relating to the capturing condition on the display screen or executes correction processing on the captured image.

An image capture method according to the second aspect of the present invention includes: an output step of sequentially outputting and displaying captured images on a display screen; a determination step of determining whether it is difficult to identify a capturing condition of the captured image that is sequentially outputted and displayed by the output step by way of visual recognition of the display screen; and an execution step of, in a case in which the determination step determines that it is difficult to identify the capturing condition in the captured image by way of visual recognition of the display screen, displaying a guidance relating to the capturing condition on the display screen or executing correction processing on the captured image.

A non-transitory storage medium encoded with a computer-readable program, according to the third aspect of the present invention, that enables a computer controlling an image capture apparatus to execute: an output function for sequentially outputting and displaying captured images on a display screen; a determination function for determining whether it is difficult to identify a capturing condition of the captured image that is sequentially outputted and displayed by the output function by way of visual recognition of the display screen; and an execution function for, in a case in which the determination function determines that it is difficult to identify the capturing condition in the captured image by way of visual recognition of the display screen, displaying a guidance relating to the capturing condition on the display screen or executing correction processing on the captured image. The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIGS. 3A and 3B are schematic diagrams showing a guidance executed in first horizon maintaining assistance processing;

FIG. 4 is a schematic diagram showing horizontal trimming executed in second horizon maintaining assistance processing;

DETAILED DESCRIPTION OF THE INVENTION

In the following, embodiments of the present invention are explained with reference to the drawings.

Figure 1:
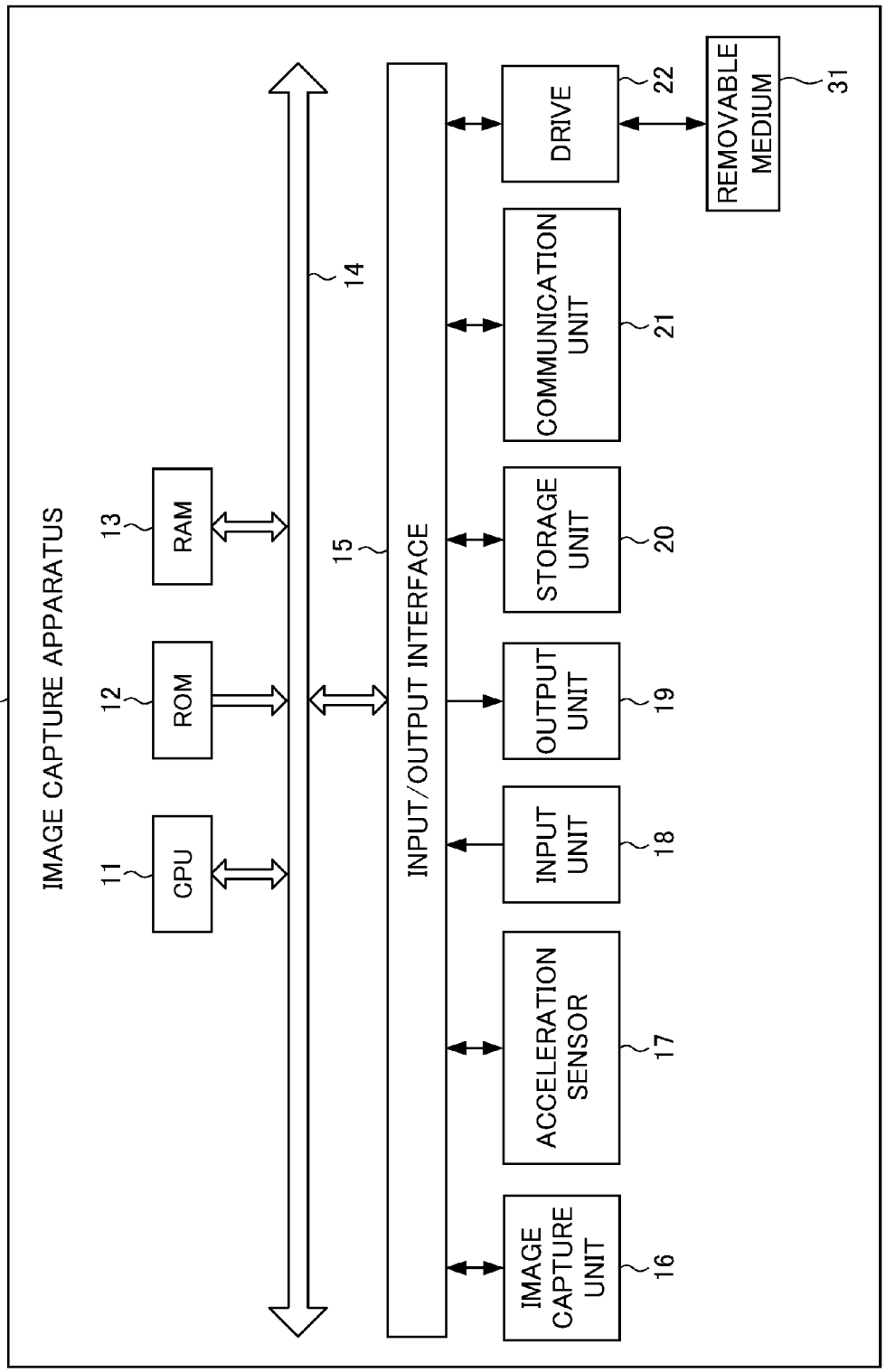
FIG. 1 is a block diagram showing a hardware configuration of an image capture apparatus according to an embodiment of the present invention.

FIG. 1 is a block diagram showing a hardware configuration of an image capture apparatus 1 according to an embodiment of the present invention.

The image capture apparatus 1 is configured as, for example, a digital camera.

The image processing apparatus 1 includes a CPU (Central Processing Unit) 11, ROM (Read Only Memory) 12, RAM (Random Access Memory) 13, a bus 14, an input/output interface 15, an image capture unit 16, an acceleration sensor 17, an input unit 18, an output unit 19, a storage unit 20, a communication unit 21, and a drive 22.

The CPU 11 executes various processing according to programs that are recorded in the ROM 12, or programs that are loaded from the storage unit 20 to the RAM 13.

The RAM 13 also stores data and the like necessary for the CPU 11 to execute the various processing, as appropriate.

The CPU 11, the ROM 12 and the RAM 13 are connected to one another via the bus 14. The input/output interface 15 is also connected to the bus 14. The image capture unit 16, the acceleration sensor 17, the input unit 18, the output unit 19, the storage unit 20, the communication unit 21, and the drive 22 are connected to the input/output interface 15.

The image capture unit 16 includes an optical lens unit and an image sensor, which are not shown.

In order to photograph a subject, the optical lens unit is configured by a lens such as a focus lens and a zoom lens for condensing light.

The focus lens is a lens for forming an image of a subject on the light receiving surface of the image sensor. The zoom lens is a lens that causes the focal length to freely change in a certain range.

The optical lens unit also includes peripheral circuits to adjust setting parameters such as focus, exposure, white balance, and the like, as necessary.

The image sensor is configured by an optoelectronic conversion device, an AFE (Analog Front End), and the like.

The optoelectronic conversion device is configured by a CMOS (Complementary Metal Oxide Semiconductor) type of optoelectronic conversion device and the like, for example. Light incident through the optical lens unit forms an image of a subject in the optoelectronic conversion device. The optoelectronic conversion device optoelectronically converts (i.e. captures) the image of the subject, accumulates the resultant image signal for a predetermined time interval, and sequentially supplies the image signal as an analog signal to the AFE.

The AFE executes a variety of signal processing such as A/D (Analog/Digital) conversion processing of the analog signal. The variety of signal processing generates a digital signal that is output as an output signal from the image capture unit 16.

Such an output signal of the image capture unit 16 is hereinafter referred to as "data of captured images". Data of an image is supplied to the CPU 11, an image processing unit (not shown), and the like as appropriate. Furthermore, with respect to data of captured images in the present embodiment, data of "live view image" refers to data of captured images that, in order to perform a live view display for assistance in photography, upon starting processing of photography in the input unit 18 or starting live view display, is captured by the image capture unit 16, then temporarily stored in the storage unit 20, and sequentially outputted to be displayed on the output unit 19. On the other hand, captured images that are captured under a photographing condition set in advance in the image capture unit 16 by a photographing operation to the input unit 18 and stored in the storage unit 20 are simply referred to as data of "captured images".

The acceleration sensor 17 is configured so as to be able to detect the speed and acceleration of the image capture apparatus 1. Based on the speed and acceleration detected at the acceleration sensor 17, it is possible to detect the posture of the image capture apparatus 1 with respect to the horizontal direction and the vertical direction. For example, detection with respect to the horizontal direction is performed by detecting whether the orientation of gravitational acceleration is directed downward at the center of the image capture apparatus 1. Therefore, at least X-axis and Y-axis acceleration sensors are used as the acceleration sensor 17 in the present embodiment.

The input unit 18 is configured by various buttons and the like, and inputs a variety of information in accordance with instruction operations by the user.

The output unit 19 is configured by the display unit, a speaker, and the like, and outputs images and sound.

The storage unit 20 is configured by DRAM (Dynamic Random Access Memory) or the like, and stores data of various images.

The communication unit 21 controls communication with other devices (not shown) via networks including the Internet.

A removable medium 31 composed of a magnetic disk, an optical disk, a magneto-optical disk, semiconductor memory or the like is installed in the drive 22, as appropriate. Programs that are read via the drive 22 from the removable medium 31 are installed in the storage unit 20, as necessary. Similarly to the storage unit 20, the removable medium 31 can also store a variety of data such as the image data stored in the storage unit 20.

With such a configuration of the image capture apparatus 1, if a live view image that cannot be visually recognized well at the output unit 19 is displayed, the image capture apparatus 1 has a function of performing electronic processing to assist photographing.

Here, "electronic processing" refers to processing of assisting photographing in a case in which appropriate photographing cannot be performed with information from only a live view image that cannot be discerned well by the naked eye, but can be discerned by an imaging element.

The electronic processing in the present embodiment refers to processing of a guidance that provides an appropriate photographing position and trimming processing (more specifically, horizontal trimming processing) that provides captured images that are trimmed to be an image produced by appropriate photographing even if the images are produced by photographing at an inappropriate photographing position.

Furthermore, "a case in which appropriate photographing cannot be performed with information from only a live view image" refers to a condition in which a live view image displayed cannot be visually recognized well by a user such as night scene, backlight, a condition in which a subject in a live view image cannot be discerned well by the naked eye, or the like. It should be noted that the condition in which a subject in a live view image cannot be discerned well depends on the photographing environment or individual visual performance. Therefore, in the present embodiment, settings can be arbitrarily made.

Figure 2:
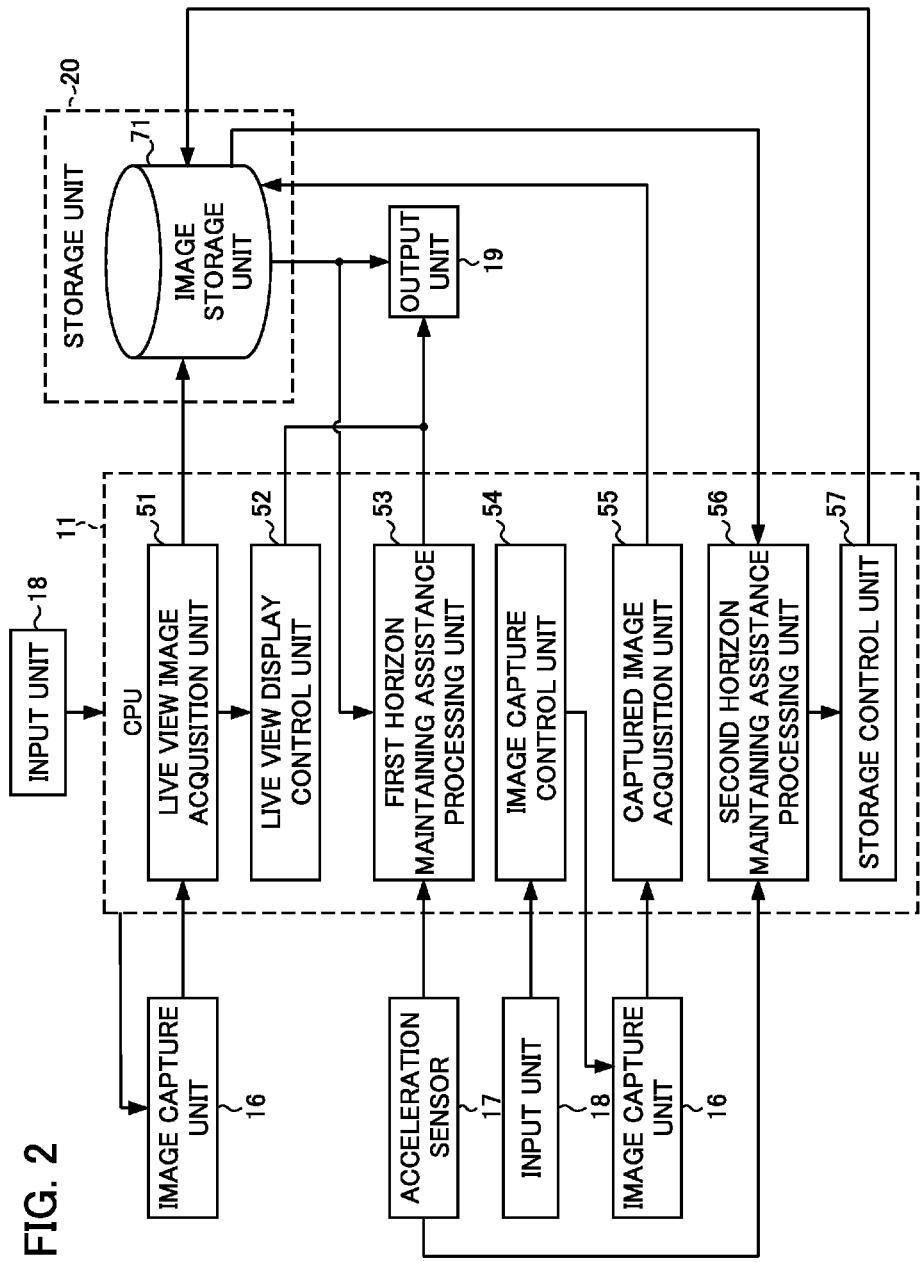
FIG. 2 is a functional block diagram showing a functional configuration for executing image capture processing among functional configurations of the image capture apparatus of FIG. 1.

FIG. 2 is a functional block diagram showing a functional configuration for executing image capture processing among the functional configurations of the image capture apparatus 1.

Image capture processing refers to a sequence of processing of photographing with assistance for maintaining a horizontal state in a case in which a live view screen cannot be discerned well in the photographing environment.

If executing the image capture processing, a live view image acquisition unit 51, a live view display control unit 52, a first horizon maintaining assistance processing unit 53, an image capture control unit 54, a captured image acquisition unit 55, a second horizon maintaining assistance processing unit 56, and a storage control unit 57 function in the CPU 11.

Furthermore, an image storage unit 71 is provided at an area in the storage unit 20.

Image data is stored in the image storage unit 71. More specifically, in the image storage unit 71, a live view image captured at the image capture unit 16 and data of a processed image of a captured image are stored.

The live view image acquisition unit 51 acquires a live view image from the image capture unit 16 and outputs to the image storage unit 71. The live view image is temporarily stored in the image storage unit 71.

The live view display control unit 52 sequentially outputs to display the live view image that is temporarily stored in the image storage unit 71 to the output unit 19.

The first horizon maintaining assistance processing unit 53 executes first horizon maintaining assistance processing. "First horizon maintaining assistance processing" refers to a sequence of processing of performing a guidance (electronic leveling instrument display and detected profile line identification and display) in a condition in which a live view image cannot be discerned well.

More specifically, the first horizon maintaining assistance processing unit 53 acquires posture information and the like from the acceleration sensor 17 to detect the horizontal state. Furthermore, the first horizon maintaining assistance processing unit 53 analyzes a live view image, determines a photographing condition and, in a case in which the live view image cannot be discerned well, controls the output unit 19 to perform a guidance.

Here, guidance executed in the first horizon maintaining assistance processing is explained.

FIG. 3 is a schematic diagram showing a guidance executed in the first horizon maintaining assistance processing.

The guidance is, for example, a display serving as a guide for photography when live view display cannot be discerned well at a time before night scene, in a backlight, or the like.

In the present embodiment, the guidance includes "electronic leveling instrument display" and "detected profile line identification and display".

"Displaying an electronic leveling instrument" displays a horizontal reference line showing a horizontal position on a live view screen.

More specifically, as shown in FIG. 3A, "electronic leveling instrument display" displays a horizontal reference line g1 on a screen d on which a live view image 1p is displayed. From the example of FIG. 3A, it can be recognized that the position relationship with the frame of the screen shifted, and the image capture apparatus 1 is leaning to the left. If a user wants to photograph in a horizontal state, the user photographs by correcting a position of the apparatus with the horizontal reference line g1 as a guide.

Furthermore, "detected profile line identification and display" displays a detected profile line by detecting a horizontal line or a horizon or a profile of a subject having a high contrast ratio such as a subject silhouette and the like that cannot be discerned well by the naked eye, but can be discerned by the imaging element.

More specifically, as shown in FIG. 3B, "detected profile line identification and display" displays a detected profile line g2 of a subject having a high contrast ratio detected by analyzing the live view image 1p on the screen d on which the live view image 1p is displayed. From the example of FIG. 3B, it is found that the apparatus is leaning to the left with respect to the horizontal reference line g1 similarly to FIG. 3A, and the detected profile line g2 is positioned in a horizontal state similarly to the horizontal reference line g1. If the user wants to photograph in a state similar to the lean of a subject detected, the user photographs by correcting a position of the apparatus with the horizontal reference line g2 as a guide.

It should be noted that, in the present embodiment, the live view display, the electronic leveling instrument display, and the detected profile line identification and display are simultaneously performed.

Furthermore, in FIGS. 3A and 3B, although the horizontal reference line g1 is shown in a dash line and the detected profile line g2 is shown in a dashed-dotted line in the present embodiment, the present invention is not limited thereto. The horizontal reference line g1 and the detected profile line g2 are acceptable so long as easily identified and discerned by user, and different kinds of line and different colors can also be available. For example, it can be configured so that the horizontal reference line g1 is set in the color red and the detected profile line g2 is set in the color green, which is the opponent color.

With reference to FIG. 2 again, in response to an image capture operation from the input unit 18, the image capture control unit 54 controls the image capture unit 16 to perform photographing with predetermined settings.

The captured image acquisition unit 55 acquires data of captured images captured by the image capture unit 16 under the control of the image capture control unit 54. The captured image acquisition unit 55 outputs and causes the data of the captured image thus acquired to be stored in the image storage unit 71.

The second horizon maintaining assistance processing unit 56 executes second horizon maintaining assistance processing. "Second horizon maintaining assistance processing" refers to a sequence of processing of producing a processed image by performing horizontal trimming on a captured image when not photographed in a horizontal state.

More specifically, the second horizon maintaining assistance processing unit 56 acquires posture information and the like of the apparatus from the acceleration sensor 17 to detect the horizontal state. Furthermore, the second horizon maintaining assistance processing unit 56 produces a processed image by cutting a portion of an image from a captured image acquired from the image storage unit 71 so that the image is set in the horizontal state thus detected. Thereafter, the second horizon maintaining assistance processing unit 56 outputs the processed image to the image storage unit 57.

The horizontal trimming is described here.

FIG. 4 is a schematic diagram showing the horizontal trimming executed in the second horizon maintaining assistance processing.

As shown in FIG. 4, regarding the horizontal trimming, trimming processing is performed on a captured image op so that an upper side and a lower side of a trimming frame of the captured image are set in parallel as horizontal. An image ip on which the horizontal trimming was performed is made to be an image similar to an image photographed in the horizontal state, even if that image was photographed with the apparatus leaning. In other words, it is possible to acquire an image photographed in the horizontal state even if photographing with the apparatus not in the horizontal state by performing horizontal trimming automatically on a captured image.

With reference to FIG. 2 again, the storage control unit 57 causes the image storage unit 71 to store a processed image outputted from the second horizon maintaining assistance processing unit 56.

Next, the flow of image capture processing executed by the image capture apparatus 1 of FIG. 1 having the functional configuration of FIG. 2 will be described.

Figure 5:
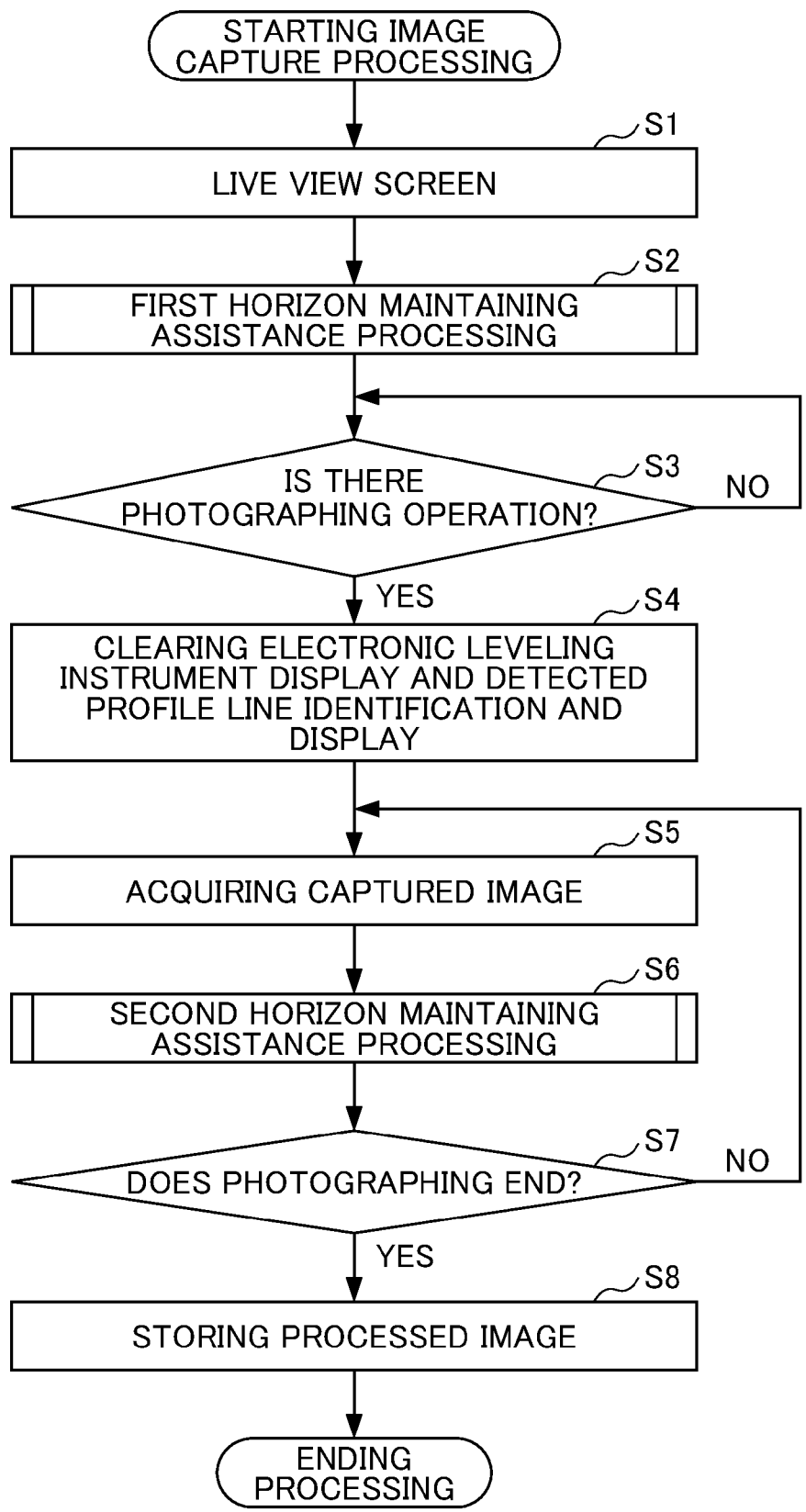
FIG. 5 is a flowchart showing a flow of the image capture processing executed by the image capture apparatus of FIG. 1 having the functional configuration of FIG. 2.

FIG. 5 is a flowchart illustrating the flow of image capture processing executed by the image capture apparatus 1 of FIG. 1 having the functional configuration of FIG. 2.

The image capture processing starts by an operation by a user on the input unit 18. When the image capture processing starts, in accordance with instructions from the CPU 11, the image capture unit 16 is controlled and capturing a live view image starts.

In Step S1, the live view display control unit 52 causes the output unit 19 to display a live view screen. In other words, the live view image is outputted and displayed at the output unit 19.

More specifically, the live view image acquisition unit 51 acquires the live view image outputted from the image capture unit 16. Then, the live view image acquisition unit 51 outputs the live view image thus acquired and temporarily stores it in the image storage unit 71. Thereafter, the live view display control unit 52 controls the output unit 19 to output and display the live view image stored in the image storage unit 71.

In Step S2, the first horizon maintaining assistance processing unit 53 executes the first horizon maintaining assistance processing. The detailed flow of the first horizon maintaining assistance processing executed by the first horizon maintaining assistance processing unit 53 is described later.

In Step S3, the CPU 11 determines whether there was a photographing operation.

If there was not a photographing operation, it is determined as NO in Step S3 and the processing enters a standby state that waits for a photographing operation.

On the other hand, if there was a photographing operation, it is determined as YES in Step S3, and the processing advances to Step S4.

In Step S4, the first horizon maintaining assistance processing unit 53 clears the electronic leveling instrument display and detected profile line identification and display. In other words, the first horizon maintaining assistance processing unit 53 erases the electronic leveling instrument display and detected profile line identification and display on the screen of the output unit 19.

In Step S5, the captured image acquisition unit 55 acquires a captured image. More specifically, since the photographing operation is inputted to the input unit 18 in Step S3, the image capture control unit 54 controls the image capture unit 16 to capture a captured image. As a result of this, the captured image captured with a predetermined setting is outputted from the image capture unit 16 and the captured image acquisition unit 55 acquires a captured image. Thereafter, the captured image acquisition unit 55 outputs the captured image to the second horizon maintaining processing unit 56.

In Step S6, the second horizon maintaining assistance processing unit 56 executes the second horizon maintaining assistance processing. With such a configuration, a processed image that is an image produced by performing horizontal trimming on a captured image is generated. The detailed flow of the second horizon maintaining assistance processing executed by the second horizon maintaining assistance processing unit 56 is described later.

In Step S7, the CPU 11 determines whether photographing ended. In other words, the CPU 11, for example, determines whether there was an operation for ending photographing.

If photographing has not ended, it is determined as NO in Step S7 and the processing returns to Step S5.

On the other hand, if photographing ended, it is determined as YES in Step S7 and the processing advances to Step S8.

In Step S8, the storage control unit 57 causes the image storage unit 71 to store a processed image.

Then, the image capture processing ends.

Figure 6:
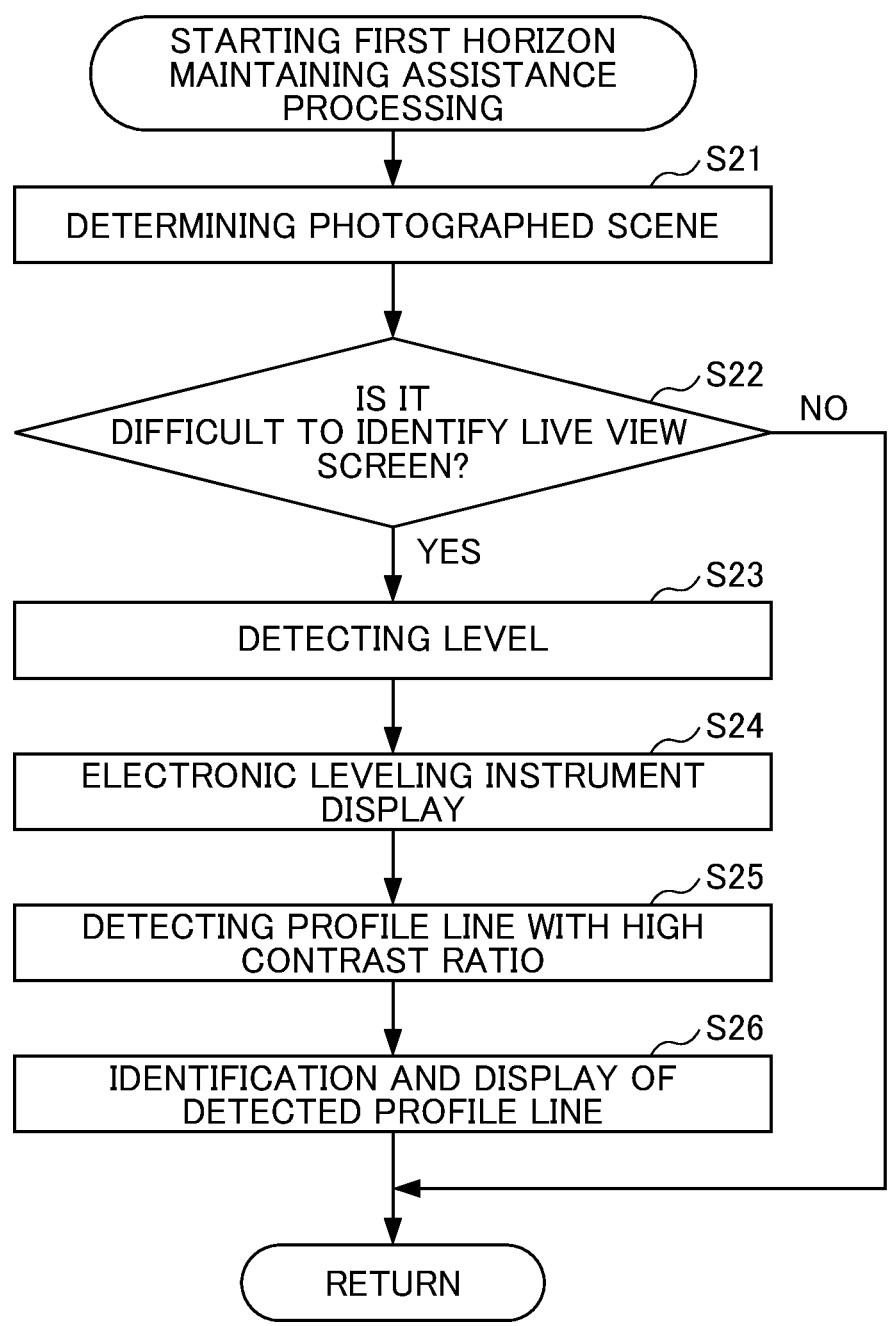
FIG. 6 is a flowchart illustrating a detailed flow of first horizon maintaining assistance processing in the image capture processing.

FIG. 6 is a flowchart illustrating the detailed flow of first horizon maintaining assistance processing in the image capture processing.

In Step S21, the first horizon maintaining assistance processing unit 53 identifies a photographed scene. More specifically, the first horizon maintaining assistance processing unit 53 analyzes a live view image and identifies the photographed scene.

In Step S22, the first horizon maintaining assistance processing unit 53 determines whether it is difficult to discern a live view screen. In other words, the first horizon maintaining assistance processing unit 53 determines whether the photographed scene corresponds to a scene that cannot be discerned well by a user (for example, a scene before night scene or in backlight).

If it is determined that it is not difficult to discern the live view screen, it is determined as NO in Step S22, and the first horizon maintaining assistance processing ends.

On the other hand, if it is determined that it is difficult to discern the live view screen, it is determined as YES in Step S22 and the processing advances to Step S23.

In Step S23, the first horizon maintaining assistance processing unit 53 detects the horizontal state. In other words, the first horizon maintaining assistance processing unit 53 detects the horizontal state based on posture information acquired from the acceleration sensor 17.

In Step S24, the first horizon maintaining assistance processing unit 53 performs the electronic leveling instrument display. More specifically, as shown in FIG. 3A, the first horizon maintaining assistance processing unit 53 displays the horizontal reference line g1 as a guidance on the screen d displaying the live view image.

In Step S25, the first horizon maintaining assistance processing unit 53 analyzes the live view image and detects a profile line of a subject with a high contrast ratio (detected profile line).

In Step S26, the first horizon maintaining assistance processing unit 53 performs the detected profile line identification and display.

More specifically, as shown in FIG. 3B, the first horizon maintaining assistance processing unit 53 displays the detected profile line g2 as a guidance on the screen d displaying the live view image and the horizontal reference line g1.

With such a configuration, the live view image, the horizon reference line, and the detected profile line are outputted and displayed on the screen of the output unit 19. The user performs changing a photographing position and the like based on the information thus displayed.

Then, the first horizon maintaining assistance processing ends.

Figure 7:
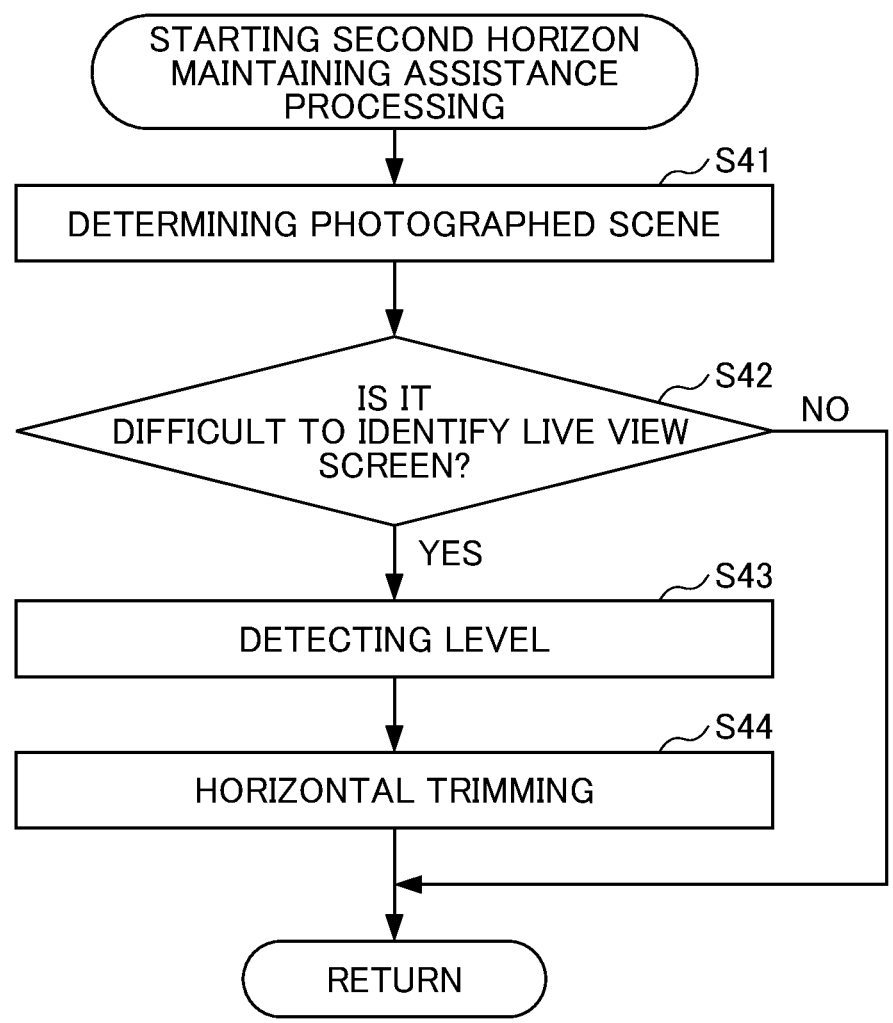
FIG. 7 is a flowchart illustrating a detailed flow of second horizon maintaining assistance processing in the image capture processing.

FIG. 7 is a flowchart illustrating the detailed flow of second horizon maintaining assistance processing in the image capture processing.

In Step S41, the second horizon maintaining assistance processing unit 56 identifies a photographed scene. More specifically, the second horizon maintaining assistance processing unit 56 analyzes a live view image and identifies the photographed scene.

In Step S42, the second horizon maintaining assistance processing unit 56 determines whether it is difficult to discern a live view screen. In other words, the second horizon maintaining assistance processing unit 56 determines whether the photographed scene corresponds to a scene that cannot be discerned well by a user (for example, a scene before night scene or in backlight).

If it is determined that it is not difficult to discern the live view screen, it is determined as NO in Step S42, and the second horizon maintaining assistance processing ends.

On the other hand, if it is determined that it is difficult to discern the live view screen, it is determined as Yes in Step S42 and the processing advances to Step S43.

In Step S43, the second horizon maintaining assistance processing unit 56 detects the horizontal state. In other words, the second horizon maintaining assistance processing unit 56 detects the horizontal state based on posture information and the like acquired from the acceleration sensor.

In Step S44, the second horizon maintaining assistance processing unit 56 performs horizontal trimming based on the horizontal state detected on a captured image acquired. As a result of this, the second horizon maintaining assistance processing unit 56 produces a processed image from a captured image. In other words, as shown in FIG. 4, the second horizon maintaining assistance processing unit 56 produces a processed image by trimming the image ip from the captured image op based on the horizontal state.

Subsequently, the second horizon maintaining assistance processing ends.

The image capture apparatus 1 configured as described above includes the output unit 19, the first horizon maintaining assistance processing unit 53, and the second horizon maintaining assistance processing unit 56.

The output unit 19 sequentially outputs and displays captured images on the live view screen as a display screen.

The first horizon maintaining assistance processing unit 53 and the second horizon maintaining assistance processing unit 56 determine whether it is difficult, by visual recognition on the live view screen, to identify a capturing condition of the captured images that are sequentially outputted and displayed by the output unit 19.

Furthermore, if it is determined that it is difficult to identify the capturing condition of the captured images by visual recognition on the live view screen, the first horizon maintaining assistance processing unit 53 and the second horizon maintaining assistance processing unit 56 display a guidance relating to capturing conditions on the display screen or execute correction processing on the captured images.

With such a configuration, regarding the image capture apparatus 1, it is possible to perform appropriate photography with only electronic processing even if it is determined that it is difficult to identify the capturing condition of the captured images by visual recognition on the live view screen.

Furthermore, the first horizon maintaining assistance processing unit 53 performs guidance for a user performing a manual operation while checking an image capturing condition on the live view image.

With such a configuration, since a guide for appropriate photography is displayed by the image capture apparatus 1 even if it is determined that it is difficult to identify the capturing condition of the captured images by visual recognition on the live view screen, it is possible to provide information that helps photographing with an appropriate photographing composition.

Furthermore, the capturing condition is a photographing composition.

Furthermore, the first horizon maintaining assistance processing unit 53 performs guidance for maintaining the horizontal state of the captured image as a guidance.

With such a configuration, it is possible to provide a user with information that helps photographing with an appropriate photographing composition by performing the guidance for maintaining the horizontal state of the captured image at the image capture apparatus 1.

Furthermore, the first horizon maintaining assistance processing unit 53 performs the electronic leveling instrument display on the live view screen as a guidance for maintaining the horizontal state of the captured image.

With such a configuration, the guidance is performed that facilitates the maintenance of the horizontal state at the image capture apparatus 1, and it is possible to provide information that helps improve a photographing composition upon photographing by maintaining the horizontal state.

Furthermore, the first horizon maintaining assistance processing unit 53 detects a profile line with high contrast ratio in a live view screen that cannot be discerned well by the naked eye, but can be discerned by an imaging element as a guidance for maintaining the horizontal state in a captured image.

With such a configuration, since profile lines such as a horizontal line, a horizon, or an edge line of a building having high contrast ratio are identified and displayed by the image capture apparatus 1, it is possible to provide information that helps improve a photographing composition including not only its positional relationship, but also the maintenance of the horizontal state upon photographing.

Furthermore, in a case of performing automatic consecutive photography such as HDR and time-lapse photography, the first horizon maintaining assistance processing unit 53 can be configured to perform automatic consecutive photography without performing guidance after performing the guidance according to the capturing condition upon starting automatic consecutive photography.

In the case of automatic consecutive photography, since a user does not check its live view image upon actual photography, it is possible to omit unnecessary display and reduce electric power consumption by the image capture apparatus 1.

Furthermore, the second horizon maintaining assistance processing unit 56 performs trimming processing on a captured image so that an upper side and a lower side of a trimming frame thereof are set in parallel as horizontal and acquires a captured image that seems to be photographed in the horizontal state.

With such a configuration, it is possible to acquire a captured image of a photographing composition in which the horizontal state is reliably maintained without requiring a user's additional operation at the image capture apparatus 1.

Furthermore, the first horizon maintaining assistance processing unit 53 and the second horizon maintaining assistance processing unit 56 make a determination that it is difficult to identify the capturing condition of the captured images by visual recognition on a live view screen for a case determined as backlight or night scene.

With such a configuration, by clearly defining that a scene photographed is backlight or night scene at the image capture apparatus 1, it is possible to determine a capturing condition necessary for reliable processing.

The first horizon maintaining assistance processing unit 53 and the second horizon maintaining assistance processing unit 56 further determine a type for the difficulty in a case in which it is difficult to determine a capturing condition of a captured image.

Furthermore, the first horizon maintaining assistance processing unit 53 and the second horizon maintaining assistance processing unit 56 execute guidance relating to a capturing condition or correction processing according to the type for the difficulty thus determined.

With such a configuration, since it is possible to execute the guidance or correction processing according to the type for the difficulty thus determined at the image capture apparatus 1, it is possible to perform appropriate photography.

It should be noted that the present invention is not to be limited to the aforementioned embodiment, and that modifications, improvements, etc. within a scope that can achieve the object of the present invention are also included in the present invention.

Furthermore, in the abovementioned embodiment, although it is configured so as to display the horizontal reference line on the live view screen so that the user can recognize the horizontal state, the present invention is not limited thereto. For example, it can also be configured so as to display a message, an indicator, and the like, when in an non-horizontal state or in the horizontal state to indicate the horizontal state.

Furthermore, in the abovementioned embodiment, although the first horizon maintaining assistance processing displaying the horizontal position and the second horizon maintaining assistance processing trimming an image based on the horizontal position are executed in the same processing, the present invention is not limited thereto. For example, it can be configured to perform only the first horizon maintaining assistance processing or the second horizon maintaining assistance processing.

Furthermore, in the abovementioned embodiment, although the horizontal reference line and the profile line as well as the live view image are displayed in the first horizon maintaining assistance processing, it may also be configured so as to display a background image that allows a user to easily recognize the horizontal reference line and the profile line instead of displaying the live view image.

Furthermore, it may also be configured so as to display grid lines as the first horizon maintaining assistance processing.

Moreover, in the abovementioned embodiment, although only determination as to whether it is difficult to determine a capturing condition is made, the present invention is not limited thereto, and it may also be configured so as to appropriately establish the processing of further determining a type for the difficulty and executing according to the type for the difficulty thus determined, from various kinds of displays of the first horizon maintaining assistance processing and the second horizon maintaining assistance processing.

Furthermore, although the kind of image is not described in the abovementioned embodiment, a single shoot of a moving image or a static image, or a consecutive shoot of a static image may be used.

Furthermore, in the abovementioned embodiment, although the first horizon maintaining assistance processing and the second horizon maintaining assistance processing are performed so as to help photographing with an appropriate photographing composition, a function such as focus aid may also be used for display in order to help photographing with the appropriate focus.

Furthermore, in the abovementioned embodiment, although the determination that it is difficult to identify the capturing condition of the captured images by visual recognition on a live view screen is made for the cases determined as backlight or night scene, the present invention is not limited thereto. The determination may also be made for situations in which it is difficult to recognize whether it is photographed in a horizontal or vertical state based on a captured image photographed under water or in the forest, for example. In such a case, it may also be configured so as to determine a state using and analyzing the captured image with the well-known analysis technologies, or it may also be configured so as to determine a state using various sensors such as a sensor that can detect water.

In the aforementioned embodiments, the digital camera has been described as an example of the image capture apparatus 1 to which the present invention is applied, but the present invention is not limited thereto in particular.

For example, the present invention can be applied to any electronic device in general having the first horizon maintaining assistance processing function and the second horizon maintaining assistance processing function. More specifically, for example, the present invention can be applied to a lap-top personal computer, a printer, a television, a video camera, a portable navigation device, a smart phone, a cell phone device, a smart phone, a portable gaming device, and the like.

The processing sequence described above can be executed by hardware, and can also be executed by software.

In other words, the hardware configuration shown in FIG. 2 is merely an illustrative example, and the present invention is not particularly limited thereto. More specifically, the types of functional blocks employed to realize the above-described functions are not particularly limited to the example shown in FIG. 2, so long as the image capture apparatus 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware. Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance. The removable medium 31 is composed of, for example, a magnetic disk (including a floppy disk), an optical disk, a magnetic optical disk, or the like. The optical disk is composed of, for example, a CD-ROM (Compact Disk-Read Only Memory), a DVD (Digital Versatile Disk), or the like. The magnetic optical disk is composed of an MD (Mini-Disk) or the like. The storage medium supplied to the user in a state incorporated in the device main body in advance may include, for example, the ROM 12 shown in FIG. 1, a hard disk included in the storage unit 20 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

Although some embodiments of the present invention have been described above, the embodiments are merely exemplification, and do not limit the technical scope of the present invention. Other various embodiments can be employed for the present invention, and various modifications such as omission and replacement are possible without departing from the spirits of the present invention. Such embodiments and modifications are included in the scope of the invention and the summary described in the present specification, and are included in the invention recited in the claims as well as the equivalent scope thereof.

While the present invention has been described with reference to the preferred embodiments, it is intended that the invention be not limited by any of the details of the description therein but includes all the embodiments which fall within the scope of the appended claims.

What is claimed is:

1. An image capture apparatus, comprising:
an output unit that sequentially outputs and displays captured images on a display screen;

a determination unit that determines whether it is difficult to identify a capturing condition of the captured image that is sequentially outputted and displayed by the output unit by way of visual recognition of the display screen; and an execution unit that, in a case in which the determination unit determines that it is difficult to identify the capturing condition in the captured image by way of visual recognition of the display screen, displays a guidance relating to the capturing condition on the display screen, wherein the execution unit performs electronic leveling instrument display on the display screen as the guidance in order to maintain a horizontal state of the captured image.

2. The image capture apparatus according to claim 1, wherein the electronic leveling instrument display on the display screen guides a user to perform a manual operation while checking the capturing condition on the display screen.

3. The image capture apparatus according to claim 2, wherein the capturing condition is a photographing composition.

4. The image capture apparatus according to claim 2, wherein the execution unit detects a profile line with a high contrast ratio within the display screen and further performs identification and display based on the profile line detected, as the guidance.

5. The image capture apparatus according to claim 2, wherein
the execution unit performs automatic consecutive photography without performing the guidance after performing the guidance according to a capturing condition upon starting the automatic consecutive photography.

6. The image capture apparatus according to claim 1, wherein the execution unit further performs correction processing, and performs, as the correction processing, trimming processing on the captured image so that an upper side and a lower side of a trimming frame are parallel as horizontal.

7. The image capture apparatus according to claim 1, wherein
the determination unit makes a determination that it is difficult to identify the captured image by way of visual recognition on the display screen for a case determined as backlight or night scene.

8. The image capture apparatus according to claim 1, wherein
the determination unit makes a determination that it is difficult to identify the captured image by way of visual recognition on the display screen for a case in which it is difficult to recognize whether it is photographed in a horizontal or vertical state.

9. The image capture apparatus according to claim 1, wherein the determination unit further determines a type of difficulty in a case in which it is difficult to determine a capturing condition of the captured image, and the execution unit executes the guidance relating to the capturing condition and correction processing according to the type of difficulty determined by the determination unit.

10. An image capture method executed by an image capture apparatus, comprising:
of sequentially outputting and displaying captured images on a display screen;
of determining whether it is difficult to identify a capturing condition of the captured image that is sequentially outputted and displayed by the output step by way of visual recognition of the display screen; and
in a case in which the it is determined that it is difficult to identify the capturing condition in the captured image by way of visual recognition of the display screen, displaying a guidance relating to the capturing condition on the display screen,
wherein said displaying the guidance comprises performing electronic leveling instrument display on the display screen as the guidance in order to maintain a horizontal state of the captured image.

11. A non-transitory storage medium having stored thereon a program that is executable by a computer controlling an image capture apparatus, the program causing the computer to execute functions comprising:
sequentially outputting and displaying captured images on a display screen;
determining whether it is difficult to identify a capturing condition of the captured image that is sequentially outputted and displayed by way of visual recognition of the display screen; and
in a case in which it is determined that it is difficult to identify the capturing condition in the captured image by way of visual recognition of the display screen, displaying a guidance relating to the capturing condition on the display screen,
wherein said displaying the guidance comprises performing electronic leveling instrument display on the display screen as the guidance in order to maintain a horizontal state of the captured image.

* * * * *